(12) United States Patent
Yacovone et al.

(10) Patent No.: US 6,968,506 B2
(45) Date of Patent: Nov. 22, 2005

(54) METHOD OF AND SYSTEM FOR COMPOSING, DELIVERING, VIEWING AND MANAGING AUDIO-VISUAL PRESENTATIONS OVER A COMMUNICATIONS NETWORK

(75) Inventors: Mark E. Yacovone, Cumberland, RI (US); Chris Paul, Lincoln, MA (US)

(73) Assignee: Brainshark, Inc., Burlington, MA (US)

( * ) Notice: Subject to any disclaimer, the term of this patent is extended or adjusted under 35 U.S.C. 154(b) by 589 days.

(21) Appl. No.: 10/052,154

(22) Filed: Jan. 16, 2002

(65) Prior Publication Data

US 2002/0109712 A1    Aug. 15, 2002

Related U.S. Application Data

(60) Provisional application No. 60/262,127, filed on Jan. 16, 2001.

(51) Int. Cl.$^7$ .............................. G06F 3/00; H04M 1/64
(52) U.S. Cl. ........................................ 715/730; 379/67.1
(58) Field of Search ................................ 715/727, 228, 715/731, 732, 730; 379/67.1, 88.13, 88.17

(56) References Cited

U.S. PATENT DOCUMENTS

| | | | |
|---|---|---|---|
| 6,008,807 A | 12/1999 | Bretschneider et al. | 345/339 |
| 6,081,278 A | 6/2000 | Chen | 345/473 |
| 6,144,991 A | 11/2000 | England | 709/205 |
| 6,161,137 A | 12/2000 | Ogdon et al. | 709/224 |
| 6,249,281 B1 | 6/2001 | Chen et al. | 345/330 |
| 6,609,038 B1 * | 8/2003 | Croswell et al. | 700/83 |
| 6,636,238 B1 * | 10/2003 | Amir et al. | 715/730 |
| 6,784,899 B1 * | 8/2004 | Barrus et al. | 715/717 |

OTHER PUBLICATIONS

"To Upload or Change your Home Page", Screenshot—WS_FTP Main Screen (WSFTP), http://www.bright.net/~lindaz/main2.htm, Jul. 27, 1998 and associated HotBot search result page showing date posted.*
Copy of International Search Report which issued from corresponding International Application No. PCT/US02/01260.
International Preliminary Examination Report for PCT/US02/01260 dated Mar. 24, 2003.
http://www.presenter.com/P1/ipresenter.asp?file=news-patent.html downloaded Jul. 30, 2001 (3 pages).

* cited by examiner

Primary Examiner—John Cabeca
Assistant Examiner—Brian J. Detwiler
(74) Attorney, Agent, or Firm—Goodwin Procter LLP

(57) ABSTRACT

A system for composing an audio-visual presentation over a communications network includes a composer system having a computer processor and associated memory and a telephone device, the composer system having a presentation containing at least one visual slide stored in the memory, and a host system including a computer processor and associated memory. The composer system:

A. establishes a connection between the computer processor and the host system over a communications network and uploads the presentation to the host system over the communications network; and B. establishes a connection between the telephone device and the host system and records an audio narration clip for each of the at least one visual slide.

The host system synchronizes each audio narration clip with its associated visual slide and stores the resulting audio-visual presentation in the memory of the host system.

54 Claims, 17 Drawing Sheets

| KEY | FUNCTION |
|---|---|
| 1 | RECORD SLIDE AUDIO |
| 2 | CONTINUOUS RECORDING |
| 3 | PLAY BACK AUDIO |
| 4 | SKIP TO PREVIOUS SLIDE |
| 5 | GO TO SPECIFIC SLIDE |
| 6 | SKIP TO NEXT SLIDE |
| 7 | ERASE SINGLE SLIDE AUDIO |
| 8 | PLAY TO END OF PRESENTATION |
| 9 | END RECORDING SESSION |
| 0 | HELP |
| # | TERMINATION KEY |

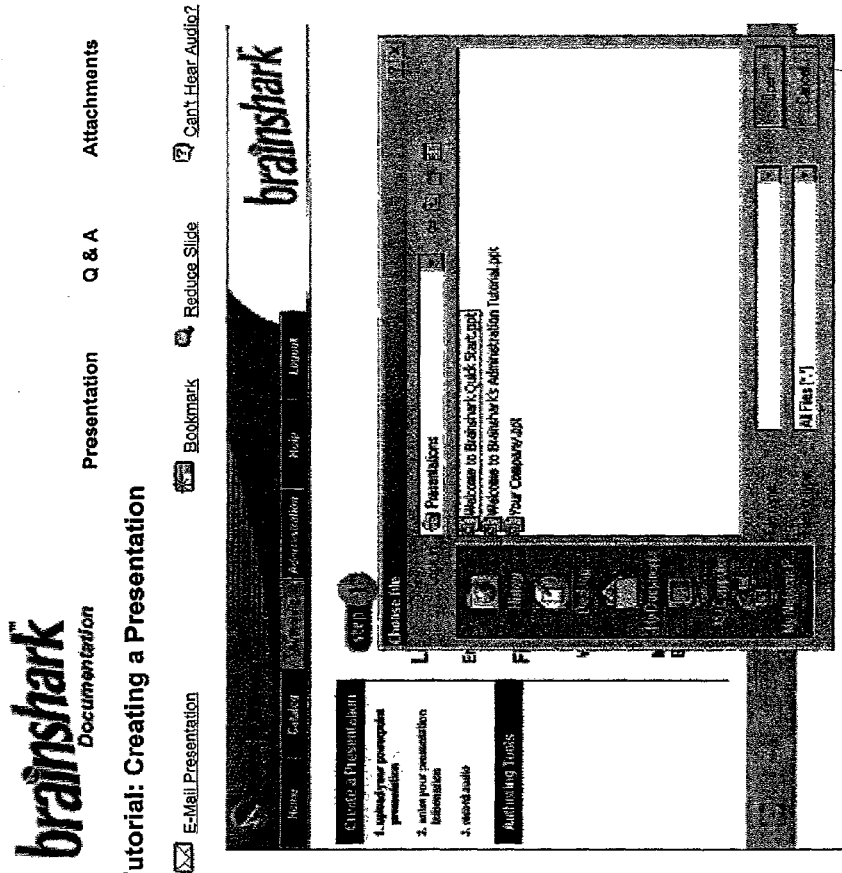
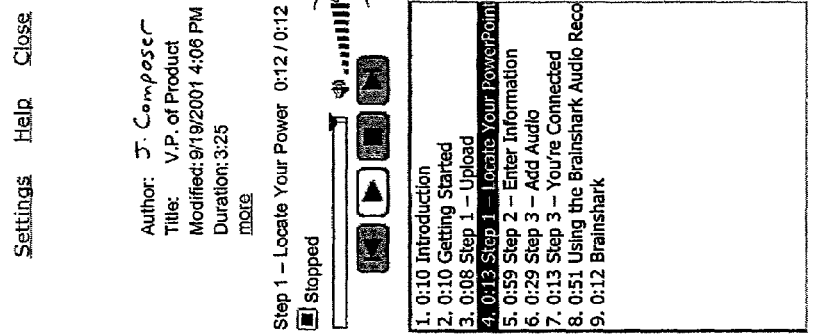
FIG. 11

METHOD OF AND SYSTEM FOR COMPOSING, DELIVERING, VIEWING AND MANAGING AUDIO-VISUAL PRESENTATIONS OVER A COMMUNICATIONS NETWORK

RELATED APPLICATIONS

This application claims the benefit of U.S. Provisional Patent Application Ser. No. 60/262,127 filed Jan. 16, 2001, entitled METHOD OF AND SYSTEM FOR AUTHORING, DELIVERING AND MANAGING ONLINE PRESENTATIONS, which application is hereby incorporated by reference in its entirety.

FIELD OF THE INVENTION

The present invention relates generally to a method of and system for composing, delivering, viewing and managing presentations over a communications network, and to a method and system which enables a composer of a presentation to upload visual portions of a presentation to a host server over a communications channel such as the internet or an intranet and to record audio portions of the presentation via a telephone. The audio and video portions of the presentation are linked and made available for viewing over the communications network.

BACKGROUND OF THE INVENTION

In today's economy, new products are being introduced and brought to the market at a faster and faster rate. People within the organizations that are releasing the products must be kept up on the presence of the new products and the new features that the products offer. However, getting information about such products to the pertinent people, such as marketing, sales and other personnel, can be difficult, especially in organizations having more than one location. Furthermore, it is not enough simply to get the information to the right people, organizations must insure that the information is transformed into useful knowledge regarding the operation, use, etc. of the product.

A traditional method of distributing product information include conducting training sessions in which a person who has been trained regarding a product trains further employees of the organization. This approach has several problems. There is a lag time between the point of needing to know the information and the actual delivery of the information. There are time and cost considerations for the trainer to travel through the organization and performing training sessions, and difficulties in scheduling training sessions can prevent attendance of necessary personnel. Another method of disseminating information is to prepare a written description of the product and to send the description to the people who require it. However, with this method, there is no way of tracking who within the organization has received and read the material, the recipient cannot ask questions in a contemporary manner and professional writers might have to be hired in order to prepare a written document that gets the necessary information across and is easy to understand.

The efficient and thorough dissemination of information is not only important in product-related markets, but also in service-related markets, in which information about a new service offered by an organization must be disseminated to the pertinent parties, and in any other situation in which information must be disseminated to a large or disperse group of people.

SUMMARY OF THE INVENTION

The present invention is directed to a method and system for disseminating information over a communications network that enables composers to upload the visual portion of a presentation, such as Power Point® slides or other file types including but not limited to Microsoft Word, Microsoft Excel, and Adobe PDF formats, to a host system and, optionally, to record the audio portion of the presentation by using a telephone. The visual portion and the audio portion are synchronized and stored on the server system. A person who desires to view the presentation may either a) log onto the host website and select the presentation for viewing, b) log onto the website that has a URL link to the presentation, or c) click on a URL link that was sent to them, typically by e-mail. The viewer is presented with a graphical user interface, which may be customizable with regard to colors, fonts, components, and positions of components, and which optionally includes information about the author of the presentation and about the presentation itself, a contents window that shows the title of each of the sections or slides of the presentation and the elapsed time for the audio portion for each section, and a main window which shows the current slide of the presentation. The viewer is able to view each of the slides and listen to the associated audio portion. The system includes a reporting device that compiles reports regarding the presentations being viewed, the viewers who are viewing the presentations and the authors who are creating the presentations. For example, a Viewing Usage report, described below, contains detailed statistics on viewers, length of views, last slide viewed, and time of view.

According to one aspect of the invention, a system for composing an audio-visual presentation over a communications network includes a composer system including a computer processor and associated memory and a telephone device, the composer system having a presentation containing at least one visual slide stored in the memory and a host system including a computer processor and associated memory. The composer system:

A. establishes a connection between the computer processor and the host system over a communications network and uploads the presentation to the host system over the communications network; and B. establishes a connection between the telephone device and the host system and records an audio narration clip for each of the at least one visual slide. The host system synchronizes each audio narration clip with its associated visual slide and stores the resulting audio-visual presentation in the memory of the host system.

The host system may include an interactive voice response system which is connectable to the telephone device of the composer system and which processes the audio narration clips. The interactive voice response system may be responsive to inputs provided by the composer system through a keypad of the telephone device. The at least one visual slide may be in the form of one of a Powerpoint® slide, a Visio® graphic, a Word® document, an Excel® document, and an Adobe® PDF file. The communications network may be the internet or an intranet. The host system may include at least one graphical user interface which is transmitted to the composer system for enabling the composer system to compose the audio-visual presentation. One of the at least one graphical user interfaces may include a slide upload page including a text box for enabling the composer system to enter the name of the presentation containing at least one visual slide which is to be uploaded to the host system. One of the at least one graphical user interfaces may include an audio recording page for enabling the composer system to record the audio narration clips, including a current slide window for displaying the slide for which an audio narration clip is being recorded and a recording navigation window, including a list of functions associated with the keys on a keypad of the telephone device. The audio recording page may further include a contents window for displaying a title of each visual slide of a selected presentation. One of the at least one graphical user interfaces may include an edit page for enabling the composer system to perform edit functions within a presentation, the edit page including a contents window for displaying a title of each visual slide of a selected presentation and a slide preview window for displaying a slide which has been selected in the contents window for editing. One of the at least one graphical user interfaces may include a merge page for enabling the composer system to edit a presentation by copying at least one of visual slides and audio narration clips from a source presentation to a destination presentation, the merge page including a source presentation contents window for displaying a title of each visual slide of a source presentation and a destination presentation contents window for displaying a title of each visual slide of a destination presentation. The merge page may further include a source slide preview window for displaying a selected slide of the source presentation. The merge page may further include a destination slide preview window for displaying a selected slide of the destination presentation. The system may further include at least one viewer system, each including a computer processor and associated memory, wherein the viewer system is connectable to the host system over the communications network for receiving a presentation stored on the host system for viewing. Upon connecting to the host system over the communications network, the viewer system is able to view a presentation stored on the host system as the presentation is received by the viewer system. Upon connecting to the host system over the communications network, the viewer system is able to download a presentation from the host system for viewing after the connection has been terminated. The host system may include a tracking component which records information about the presentations, including at least one of the identity of the composer system that composed a particular presentation, the identity of each viewer system that downloads the particular presentation, the time at which the particular presentation was viewed, and how many slides of the particular presentation were viewed. The audio narration clips may be played through the computer processor of the viewer system. The viewer system may further include a telephone device which is connectable to the host system and the audio narration clips are played through the telephone synchronous with its associated visual slide. The host system may include a security component for controlling access to the presentations by the at least one viewer system. The security component may require that the viewer system provide an assigned identification index before accessing the presentations. The identification index may provide the viewer system with access to less than all of the presentations stored on the host system. The host system may include a report component which generates reports from the presentation information obtained by the tracking component. The edit function may include rearranging slides, renaming slides, deleting slides and uploading new slides. The host system may generate a viewing receipt which includes the presentation information recorded by the tracking component, wherein the viewing receipt is transmitted to the composer system when a presentation composed by the composer system is viewed by the viewer system. The interactive voice response system may include a speech recognition component which is responsive to verbal inputs provided by the composer system through a transmitter of the telephone device.

According to yet another aspect of the invention, a method of composing an audio-visual presentation includes:

A. establishing a connection between a computer of a composer system and a host system over a communications network;

B. uploading at least one visual slide from the composer system to the host system;

C. establishing a connection between a telephone device of the composer system and the host system;

D. recording an audio narration clip for each of the at least one visual slides using the telephone device;

E. synchronizing each audio narration clip with its associated visual slide; and F. storing the resulting audio-visual presentation in a memory of the host system.

According to yet another aspect of the invention, a system for composing audio-visual presentations over a communications network includes a composer system having a telephone device and a host system having a computer processor and associated memory, the host system having at least one visual slide stored in the memory. The composer system establishes a connection between the telephone device and the host system and records an audio narration clip for each of the at least one visual slides and the host system synchronizes each audio narration clip with its associated visual slide and stores the resulting audio-visual presentation in the memory of the host system.

BRIEF DESCRIPTION OF THE DRAWINGS

The foregoing and other objects of this invention, the various features thereof, as well as the invention itself may be more fully understood from the following description when read together with the accompanying drawings in which:

FIG. 5 is a schematic diagram showing the functions associated with each of the keys of the telephone key pad in accordance with the present invention;

FIGS. 10–14 are screen printouts of a presentation generated in accordance with the present invention;

FIG. 17 is screen printout of an edit presentation data screen in accordance with the present invention.

DETAILED DESCRIPTION

The present invention is directed to a method of and system for composing presentations through the use of a computer that is connected to a computer system via the internet or an intranet and a telephone connected to the computer system via a standard telephone line. A presentation composer is able to upload any type of visual aid files, such as Power Point® slides, Lotus® screen cam files, Word® files, Adobe Acrobat® files, Visio® files, etc., to the web site server through the computer and to record audio portions relating to each slide via the telephone connection. The presentation composer is also able to edit presentations in this manner. A person wishing to view a presentation uses a computer to connect to the web site server to which the presentation is associated and select the presentation to view. The viewer is presented with a graphical user interface including a window within which each slide of the presentation is shown, a window including the title of each slide and the duration of the audio portion associated with each slide, and a window including information about the presentation and the presentation composer. The viewer has the ability to navigate through the presentation and is able to jump between slides in the presentation, replay slides, and submit questions and comments to the composer.

The system includes a report generator which enables an administrator or author to view statistics of each presentation, such as the number of times each presentation has been viewed, how much of each presentation has been viewed, who has viewed each presentation, how much each presentation has been edited by its composer, etc. This feature enables the administrator to track the use of each presentation to determine its effectiveness and it also enables the administrator to insure that the presentations are being viewed by people who are required to view them.

Figure 1:
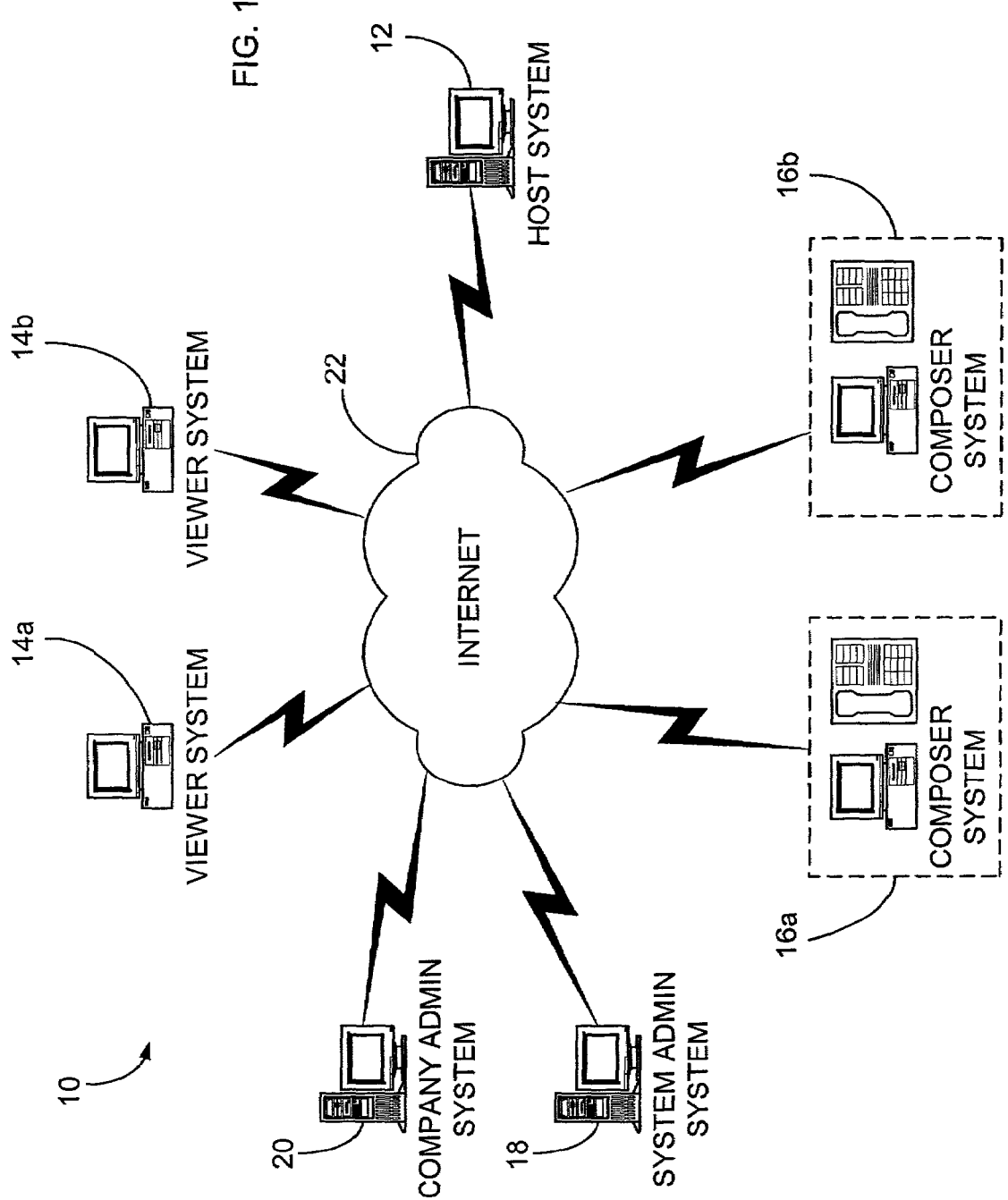
FIG. 1 is a schematic diagram of the system for authoring, delivering, viewing and managing presentations in accordance with the present invention.

FIG. 1 shows a schematic diagram of a system 10 for authoring, delivering, viewing and managing audio-visual presentations over a communications network in accordance with a preferred embodiment of the present invention. The system 10 includes host system 12, viewer systems 14a and 14b, composer systems 16a and 16b, system administration system 18 and company administration system 20, all connected to a common communications network 22. While two viewer systems 14a and 14b and two composer systems 16a and 16b are shown in FIG. 1, it will be understood that as few as one viewer system and one composer system may be utilized in the system 10, or many more than two of each system may be utilized. Two viewer systems 14a and 14b and composer systems 16a and 16b are shown in FIG. 1 for the purpose of example only. Preferably, host system 12, user systems 14a and 14b, composer systems 16a and 16b, system administration system 18 and company administration system 20 are each a personal computer such as an IBM PC or IBM PC compatible system or an APPLE® MacINTOSH® system or a more advanced database computer system such as an Alpha-based computer system available from Compaq Computer Corporation or SPARC® Station computer system available from SUN Microsystems Corporation, although a main frame computer system can also be used. Preferably, the communications network 22 is a TCP/IP-based network such as the Internet or an intranet, although almost any well known LAN, WAN or VPN technology can be used. As shown in the figure, composer systems 16a and 16b each also include a standard telephone which is separately connectable to host system 12 via standard telephone lines.

In one preferred embodiment of the invention, the viewer systems 14a and 14b, composer systems 16a and 16b, administration system 18 and management system 20 are IBM PC compatible systems operating an operating system such as the Microsoft Windows® operating system, and host system 12 is configured as a web server providing access to information such as web pages in HTML format via a protocol such as the HyperText Transport Protocol (http). In addition to web services, the host system also includes streaming media services or servers and IVR services or servers. In addition to HTTP for web servers, the media servers use different protocols like MMS and RTSP (as well as HTTP) to stream media (audio & video). The viewer systems 14a and 14b, composer systems 16a and 16b, system administration system 18 and company administration system 20 include software to allow viewing of web pages, commonly referred to as a web browser, thus being capable of accessing web pages located on host system 12. Alternatively, viewer systems 14a and 14b, composer systems 16a and 16b, system administration system 18 and company administration system 20 can be any wired or wireless device that can be connected to a communications network, such as an interactive television system, including WEBTV, a personal digital assistant (PDA) or a cellular telephone.

Figure 2:
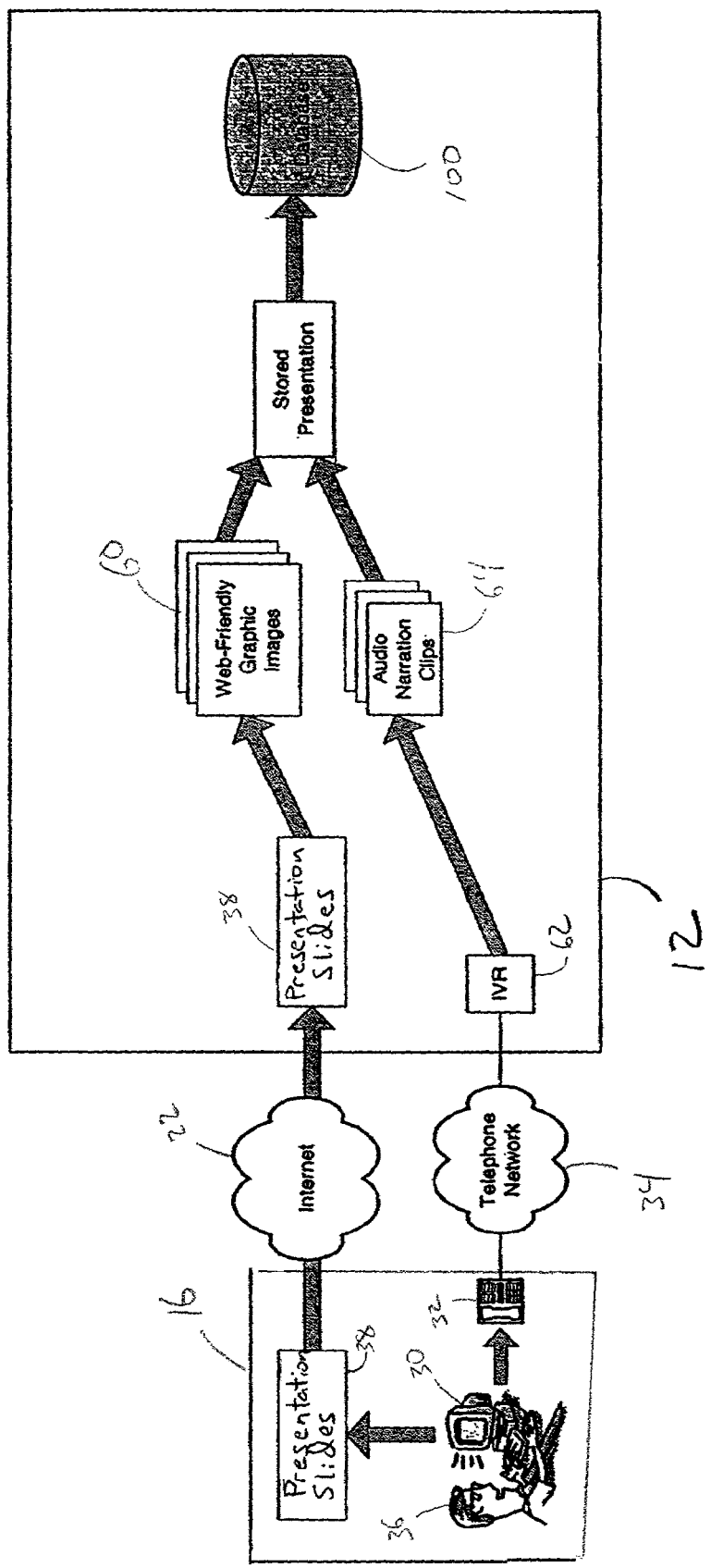
FIG. 2 is a more detailed schematic diagram of the interaction between the composer system and the host system in accordance with the present invention.
Figure 3:
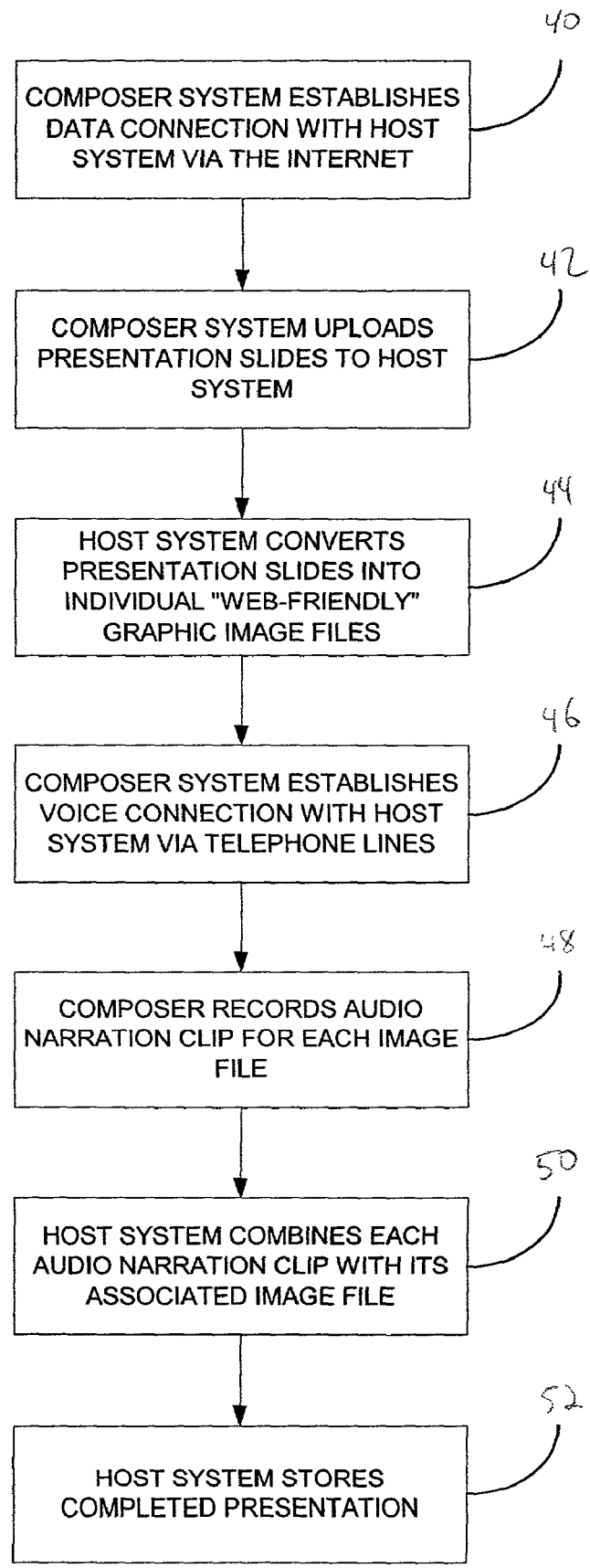
FIG. 3 is a flow diagram showing the steps involved in the method of authoring presentations in accordance with the present invention.

The composition of a presentation by the composer system 16 will now be described with reference to FIG. 2, which is a schematic block diagram showing the interaction between a composer system 16 and the host system 12 during the composition of a presentation in accordance with the present invention, and FIG. 3, which is a flow diagram showing the steps involved in the composition of a presentation. As shown in FIG. 2, the preferred embodiment of composer system 16 includes a computer 30, which is connectable to the host system 12 via the internet 22 for the purpose of sending and receiving graphic and other data to and from the host system; a telephone 32, which is connectable to the host system 12 via public switched telephone network 34, for the purpose of sending and receiving voice to and from the human composer 36 who uses the computer 32 and a standard telephone 34 to compose the resulting presentation. Alternatively, pre-recorded audio can also be uploaded to the host system 12 from composer system 16.

Authoring

Prior to establishing a connection with the host system 12, the composer 36 generates presentations slides 38 using any of a variety of file types, such as Powerpoint® Power Point®, Lotus® screen cam, Word®, Adobe Acrobat®, Visio®, etc. These presentation slides 38 can includes text, photographs, charts, graphs, and any other form of visual data that enables the composer 36 to describe the subject matter of the presentation. After each presentation slide is generated, it is associated with a unique slide title and the group of slides is saved in the memory of the computer 32 under a unique presentation name. In step 40, FIG. 3, the composer system 16, under the direction of the composer 36, establishes a connection between the computer 30 and the host system 12 via the internet 22 or any other network, such as an intranet. The composer system 16 is presented with a web page that presents the composer system with several options, including composing a presentation, editing a presentation, and publishing a presentation. Once the composer 36 selects the "compose" option, the host system 12 presents a web page to the composer that prompts the composer to provide the file name of the group of slides that will be used to compose the presentation. Once the composer provides the file name, the group of presentation slides 28 or other file type is uploaded to the host system 12 via the internet.

Alternatively, the composer may choose to select a single slide "template" presentation provided by the host server 12, eliminating the need to upload a file of any type. These templates allow the composer to enter text onto a default template slide, select a font, and continue the process below as if they had uploaded a single slide PowerPoint® presentation. In the case where a company requires in-house presentations to follow a particular format, slide templates may be developed which follow the format, such that, when a composer composes a presentation, the composer only needs to provide the specific information of the presentation within the templates, thereby eliminating the need to upload files to the host system.

Upon receiving the uploaded content, i.e., presentation slides 38 in this example, the host system 12 converts each of the slides into a graphic image file that is capable of being easily transmitted over the internet and displayed on a viewer system 14, step 42. The host system 12 saves each graphic image file in a directory, where each file is identified by its title and assigned a number according to the order in which it was received by the host system 12. The host system extracts the title of each slide (if PowerPoint®) and stores each slide title in the database for use later during playback by the viewer in the form of an active table-of-contents. The table-of-contents is selectable by the viewer and allows the viewer to navigate from slide to slide at anytime during playback of the presentation. Such navigation is described in greater detail below. The host system transmits a confirmation screen to inform the composer that the presentation slides have been successfully received and converted to graphic image files. In order to enable the composer 36 to add the audio portion to the presentation, as described below, the host system 12 generates a Presentation Edit Session Identifier (PESI), which is used by the composer to identify the presentation to be edited during the audio composition portion, described below.

Figure 17:
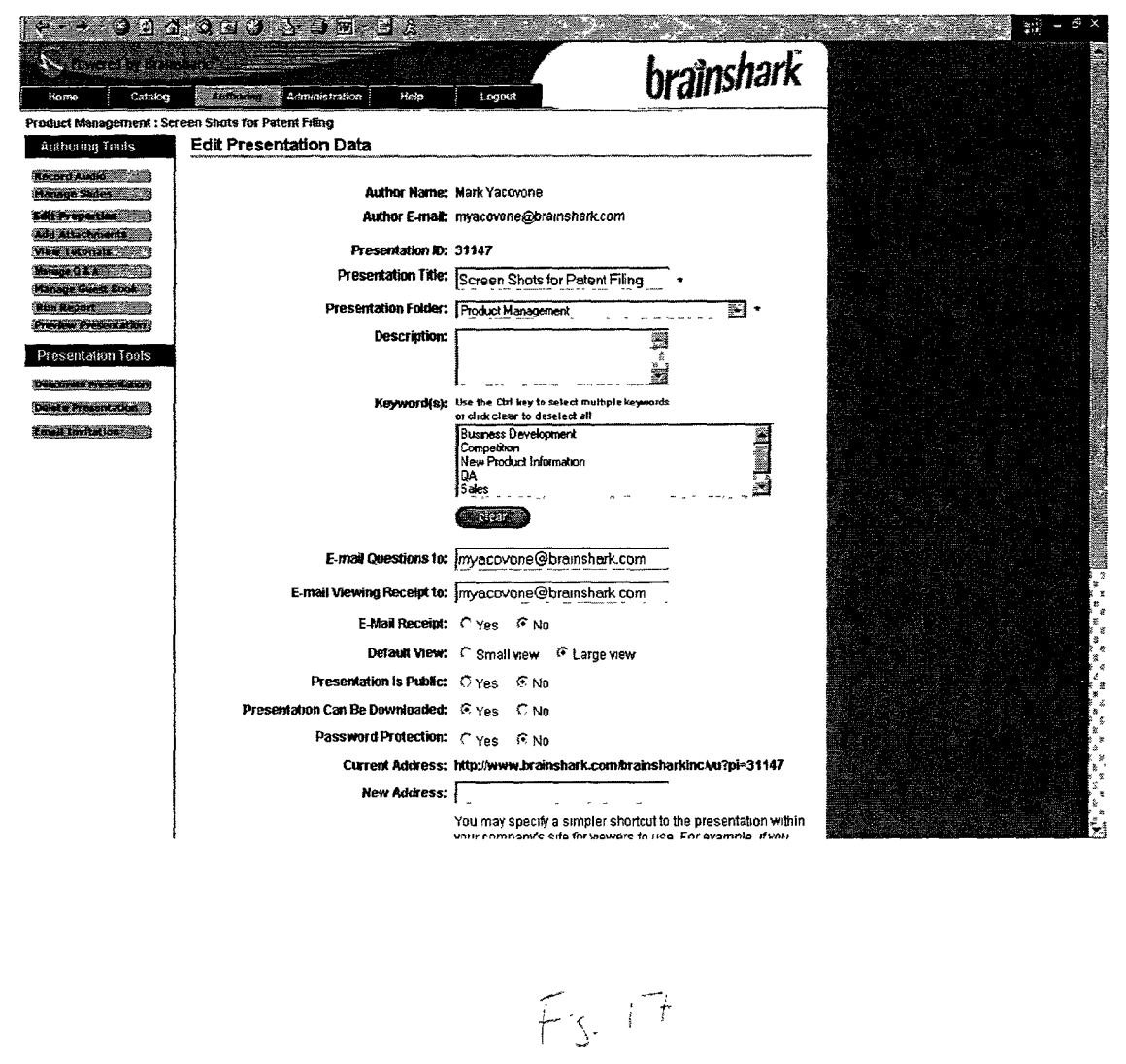

Once the presentation slides are uploaded to the host server 12, the composer may modify the following properties of the presentation, as shown in FIG. 17:

Presentation Title (which is indexed and searchable);
Presentation Folder (which identifies the location of the presentation as well as helps to define the security permissions for the presentation);
Free Text Description (which is indexed and searchable);
Keywords (which are indexed an searchable);
An e-mail address for viewer questions;
An e-mail address for a viewing receipt (this enables an automatic e-mail receipt to the specified e-mail address when the presentation is viewed);
Default View (determines whether the host server 12 by default uses small or large slide images on playback);
Presentation Security level (levels may include Public (accessible to anyone with the URL) and Private (requires user name and password);
Whether the presentation can be downloaded by the viewer for offline viewing;
Whether a presentation password is required (an additional password required by viewers in order to view the presentation); and
A substitute URL for the default URL provided.

In step 46, the composer 36 establishes a connection between the telephone 32 and the host system via a public switched telephone network 34. Alternatively, telephone 32 could be a wireless telephone, such as a cellular telephone, and the connection between the telephone 32 and the host network 12 takes place in a wireless manner. Host system 12 includes an Interactive Voice Response (IVR) system 62, which is used to receive the audio input from the composer 36 and to provide instructions to the composer. The IVR 62 includes hardware and software which enables it to respond to inputs received from the composer via the touch pad of the telephone 32 and to record audio inputs from the composer. Such IVRs are known in the art and are available from several sources, such as Dialogic®.

Figure 4:
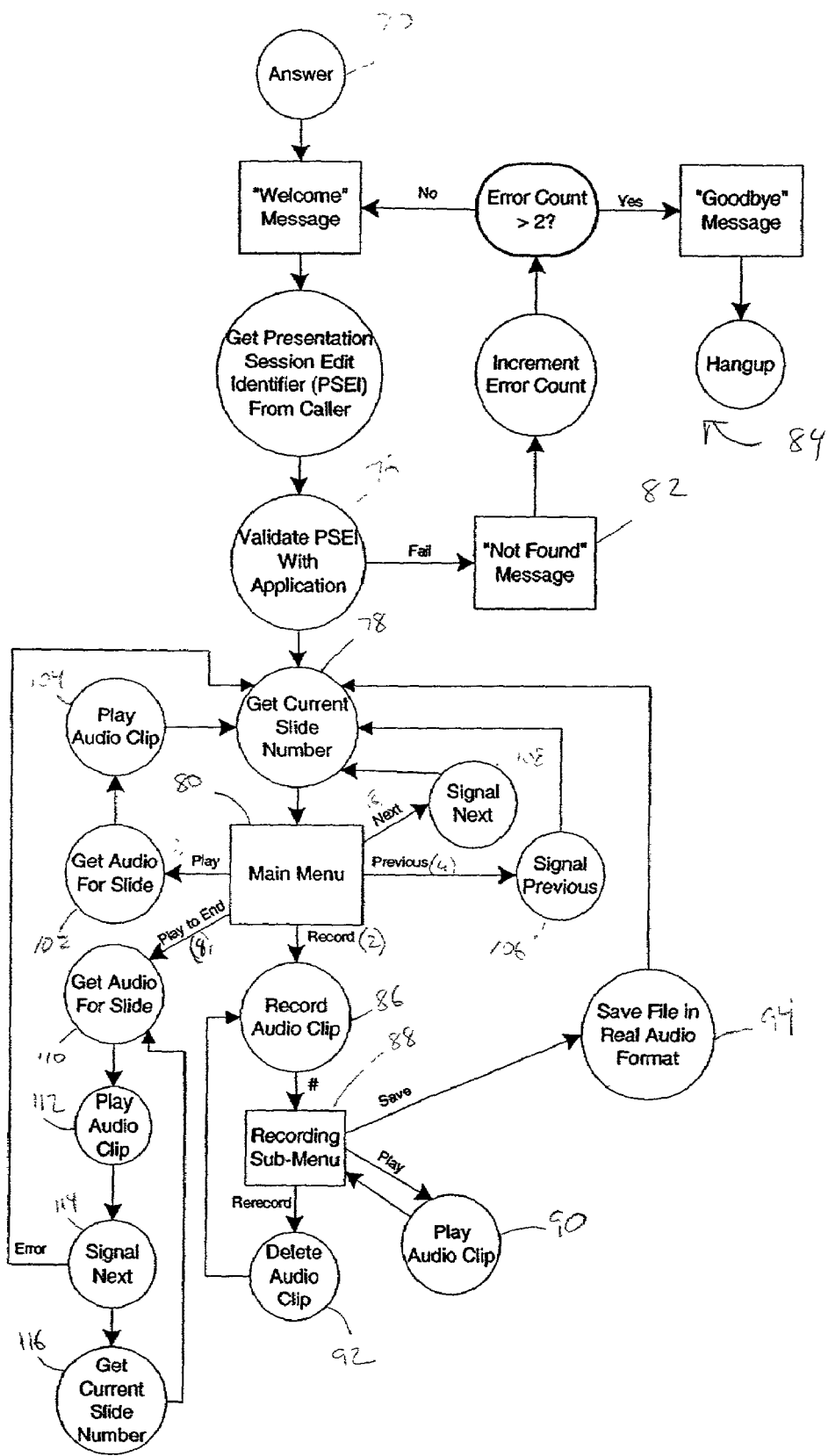
FIG. 4 is a flow diagram showing the steps involved in recording audio narration clips for each slide in accordance with the present invention.
Figure 6:
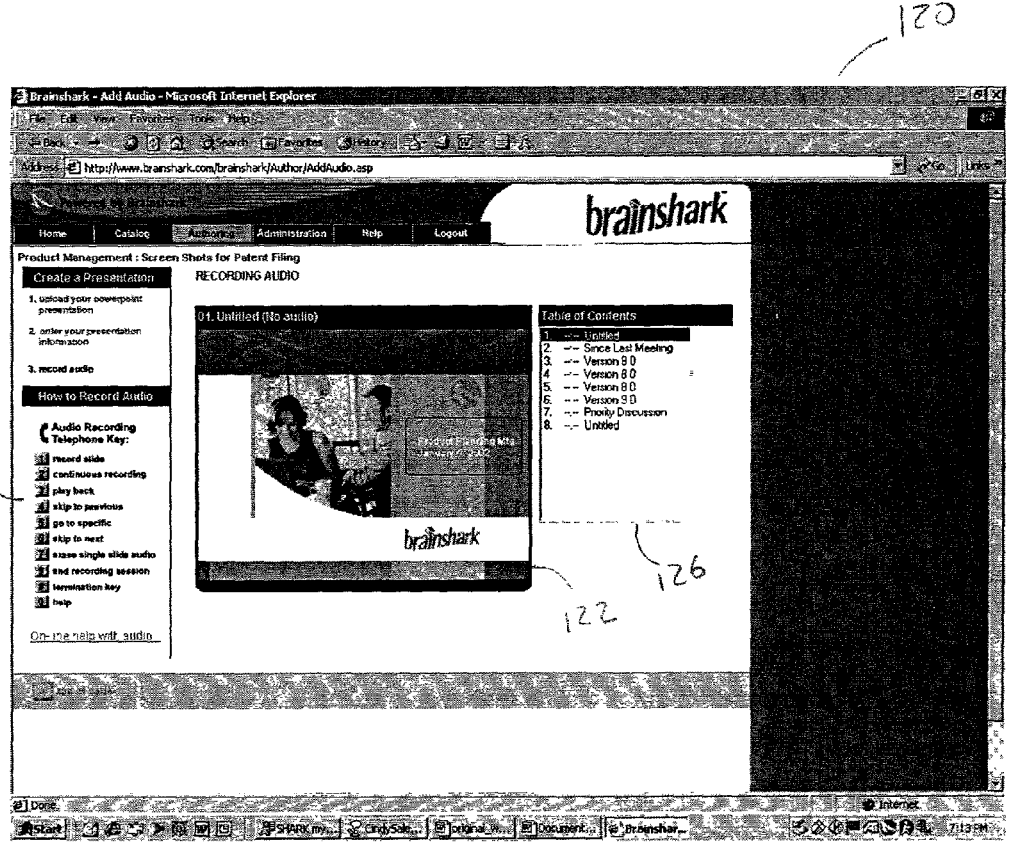
FIG. 6 is a schematic diagram of an audio recording screen presented to a composer for the purpose of enabling the composer to record audio narration clips in accordance with the present invention.

As set forth above, the composer 36 establishes a connection with the host system 12 through IVR 62 in order to add an audio narration clip 64 to each of the graphic image files which were previously uploaded to the host system 12, step 48. FIG. 4 is a flow diagram which shows steps involved in one embodiment of recording narration files for the presentation slides of the presentation. FIG. 5 is a schematic diagram of an IVR navigation window 129 which shows how each key of the key pad of the telephone 32 is used to navigate through an audio narration file recording session. Once the composer is connected to the IVR, step 70, the IVR plays a "Welcome" message to the composer 36, step 72 and prompts the composer to input the PESI, step 74. This insures that the correct composer is gaining access to a particular presentation and provides the host system with the necessary information that will enable it to attach the audio narration clips to the correct graphic image files of the correct presentation. Once the PESI is validated, step 76, the system accesses the first slide (slide number 1) of the presentation, step 78, and the recording main menu is presented to the composer, step 80. The host system 12 also transmits an audio recording screen which shows the current slide, as well as other information, to the computer 30. Such an audio recording screen is shown in FIG. 6. As can be seen in the figure, audio recording screen 120 includes a slide window 122 in which the current slide for which an audio narration clip is being recorded is displayed, a contents window 126 in which the title of each slide of the presentation is displayed and an IVR navigation window 129, in which the function of each of the keys of the key pad of telephone 32 is displayed. Once audio has been added to the presentation, other screens display the length of the audio narration clip associated with each slide and, optionally, an additional information window, in which links to supplemental information provided by the composer, such as PDF files, Word® files, Visio® files, etc., are displayed.

If, in step 76, the host system determines that the PESI entered by the composer is invalid, a "Not Found" message is transmitted to the composer through the IVR, step 82, and the system enters a loop 84 which prompts the composer to reenter the PESI, and ends the session if the composer does not enter a valid PESI.

As set forth above, once the PESI is validated, slide number 1 of the presentation is accessed by the host system 12, and the recording main menu is presented to the composer, step 80. The recording main menu is presented to the composer in the form of an audio file that informs the composer of the function of each of the keys on the key pad of the telephone 32. An example of functions associated with each of the keys of the key pad is shown in FIG. 5. As shown in the figure, key 1 is pressed to initiate the recording of the current slide, wherein the composer is able to record an audio narration clip for as long as necessary, and ends the recording of the clip by pressing the pound (#) key, and key 2 is pressed to begin continuous recording of the audio narration clip for one slide; pressing 2 again advances to the next slide and # ends the recording. Key 3 is pressed to play back the audio narration clip of the present slide and key 4 is pressed to cause the system to skip to the previous slide in the sequence, thus enabling the composer to listen to the audio narration clip previously recorded or to record an another audio narration clip for the slide. Key 5 is pressed to enable the composer to specify the number of a slide to which the system will skip for the purpose of enabling the composer to listen to the audio narration clip previously recorded or to record an another audio narration clip for the slide and key 6 is pressed to cause the system to skip to the next slide in the sequence for the same purpose. Key 7 is pressed to enable the composer to erase the audio narration clip associated with the current slide and key 8 is pressed to play the entire presentation. Key 9 is pressed to end the audio narration clip recording session and key 0 is pressed if the composer needs additional help in the recording process, wherein the system can provide further audio instructions in the audio narration clip recording process. While certain functions have been described in connection certain keys of the key pad of telephone 32, this is for example only, and it will be understood the functions described, or additional or different functions, may be programmed to be initiated through the pressing of any combination of the keys available on the telephone key pad.

Alternatively, IVR 62 may include a speech recognition device which enables the composer to use verbal commands to provide instructions to the IVR. This speech recognition device converts spoken words to the signal necessary for enabling the IVR to carry out the instruction as if a key on the telephone keypad had been pressed. Furthermore, the speech recognition system, in connection with the template feature of the host system 12, enables the composer to compose presentation solely with a connection to the host system 12 through the IVR 62 with the telephone device 32, without computer 30. In this embodiment, the composer, using telephone device 32, selects from the available templates stored on the host system 12 and provides verbal information for each of the editable areas of the template. The speech recognition system of the IVR 62 converts the verbal information to text and inserts it in the appropriate area on the template. After providing the text portion of the template, the composer is able to record the audio narration clip for each template.

Referring back to FIG. 4, the composer is presented with the recording main menu, step 80, and the host system 12 transmits the graphic image file of slide number one to the composer system 16 to be viewed by the composer 36. The composer then selects one of the functions from the recording main menu to begin the recording process. By pressing key 1 or 2, the composer is able to begin recording the first audio narration clip to be associated with slide number one, step 86. The audio narration clip is recorded by the host system 12 as the composer speaks into the telephone 32. When the composer 36 has completed the audio narration clip, the pound (#) key is pressed to stop the recording. Upon pressing the pound (#) key, the composer is presented with a recording sub-menu, step 88, which, similarly to the recording menu, enables the composer to choose further functions by pressing certain of the keys of the telephone key pad. From the recording sub-menu, the composer 36 can choose to play the recorded audio narration clip, step 90, in which case the audio narration clip is played by the host system 12 through the IVR and the telephone 32. After listening to the audio narration clip, the composer can choose to rerecord the audio narration clip, in which case the previously recorded clip is deleted, step 92, and the system returns to step 86 to enable the composer to record another audio narration clip for the slide. Once the composer is satisfied with the recorded audio narration clip, the composer can choose a save function from the recording sub-menu, in which case the clip is saved, currently in VOX format, and converted to the Real Audio® and Microsoft® Media Player® formats, after the user has pressed 9 to exit from the IVR in step 94. The saved clip is then synchronized with the associated slide, forming the first completed slide of the presentation, which is stored on the database 100 of the host system 12. When an audio narration file is recorded for each slide, it is synchronized with the slide, step 50, FIG. 3, and saved with its associated slide on the database 100, step 52. This enables the composer to individually record and edit the audio narration clip for each slide.

The IVR 62 then returns to the recording main menu, and the composer is able to select the next function from the menu. If the composer presses key 3, to play the audio narration file for the current slide, the audio narration file for the slide is retrieved from the database 100, step 102, and it is played, step 104. If the composer presses key 4, to skip to the previous slide, step 106, the system retrieves the previous slide (assuming that the current slide is not slide number one) and transmits the graphic image file of the slide to the computer 30 for viewing by the composer 36. The composer then selects from the functions of the recording main menu. Similarly, if the composer presses key 6, to skip to the next slide, step 108, the system retrieves the next slide in the and transmits the graphic image file of the slide to the computer 30 for viewing by the composer 36. The composer then selects from the functions of the recording main menu. If the composer presses key 8, to play the entire presentation, the system retrieves the audio narration clip for the first slide, step 110, and plays the clip, step 112. After the completion of the audio narration clip, the system increments the slide number count, step 114, retrieves the next slide, step 116, and the audio narration clip for the next slide, step 110 and plays the audio narration clip, step 112. This loop is repeated until the no more audio narration clips are available, in which case, at step 114, the system returns to the recording main menu. Although not shown in FIG. 5, pressing key 5 enables the composer to call up a specific slide, which is chosen by number using the key pad, to record or edit the audio narration clip associated with that slide. After an audio narration clip is recorded for and synchronized with each slide, the audio narration clip recording session is completed when the composer presses key 9 from the main menu.

In addition to presentation slides and audio narration clips, the composer is able to upload addition information files to attach to the presentation. As described above, these files can include PDF files, Word® files, Visio® files, Lotus® screen cam files, etc. These files may be uploaded by the composer to provide additional information to the viewer, who is able to access the files through links in the addition information window 128. Throughout the discussion of the invention, these files are referred to as "slides". The presentation is now ready to be viewed from a viewer system 14, as is described below.

Figure 7:
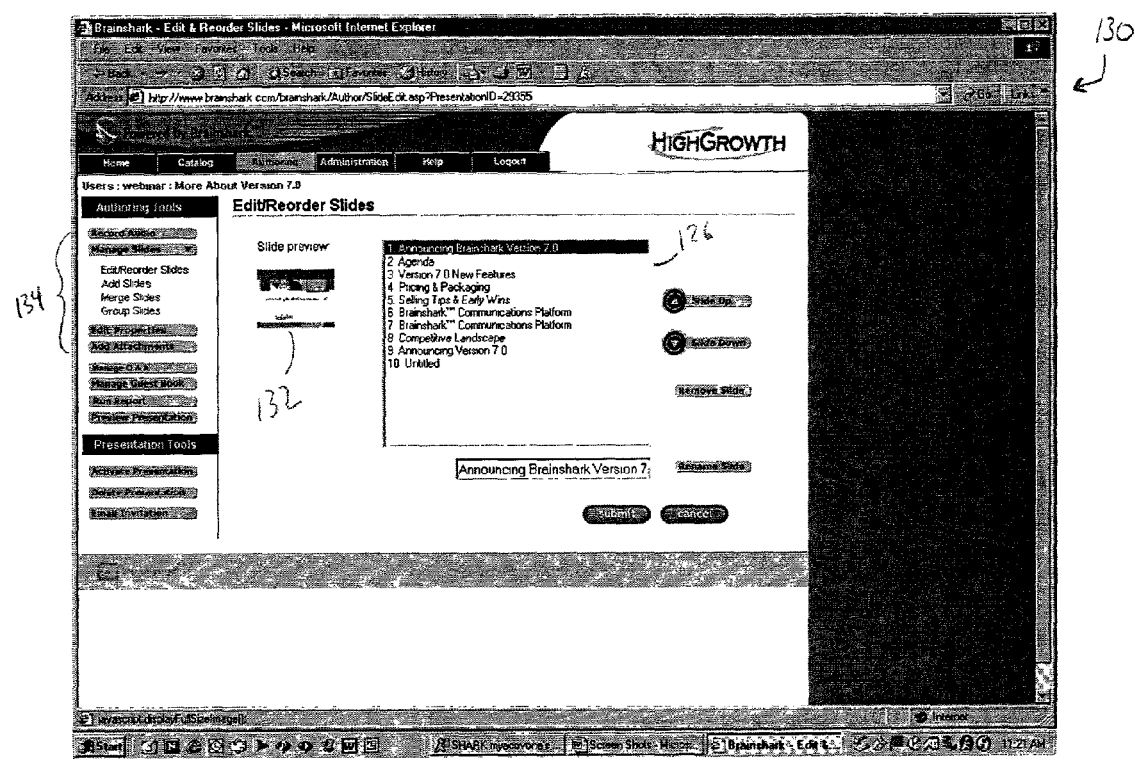
FIG. 7 is a schematic diagram of a presentation edit screen presented to a composer for the purpose of enabling the composer to edit a presentation in accordance with the present invention.

The host system 12 also enables the composer 36 to edit a presentation after it has been completed. The composer establishes a connection between the composer system 16 and the host system 12 via the internet 22. Upon selecting the presentation to be edited from the web site associated with the host system 12 and selecting the "Edit Presentation" link from screen 120, the composer is presented with a presentation edit screen 130, FIG. 7. Presentation edit screen 130 includes, contents window 126, and a slide preview window 132. As set forth above, contents window 126 includes a numbered listing including the title of each slide of the presentation. When a particular slide is selected in contents window 126, slide number 1 in this example, the slide is shown in slide preview window 132. The composer is then able to add, delete and change the order of the slides in the presentation using the slide management links shown at 134. From the presentation edit screen 130, the composer is also able to group certain of the slides of the presentation into groups of slides, referred to as learning objects, for the purpose of providing more specific information about a sub-topic within the overall presentation. Since, as described above, each presentation slide may have its associated audio narration clip synchronized therewith, whenever the composer changes the order of the slides or deletes a slide, the synchronized audio narration clip is moved or deleted along with its associated slide. No extra steps are required of the composer to move or delete the audio narration clips. Once the composer is finished editing the presentation, the composer can "publish" the presentation, thereby making the presentation accessible to viewers.

Figure 15:
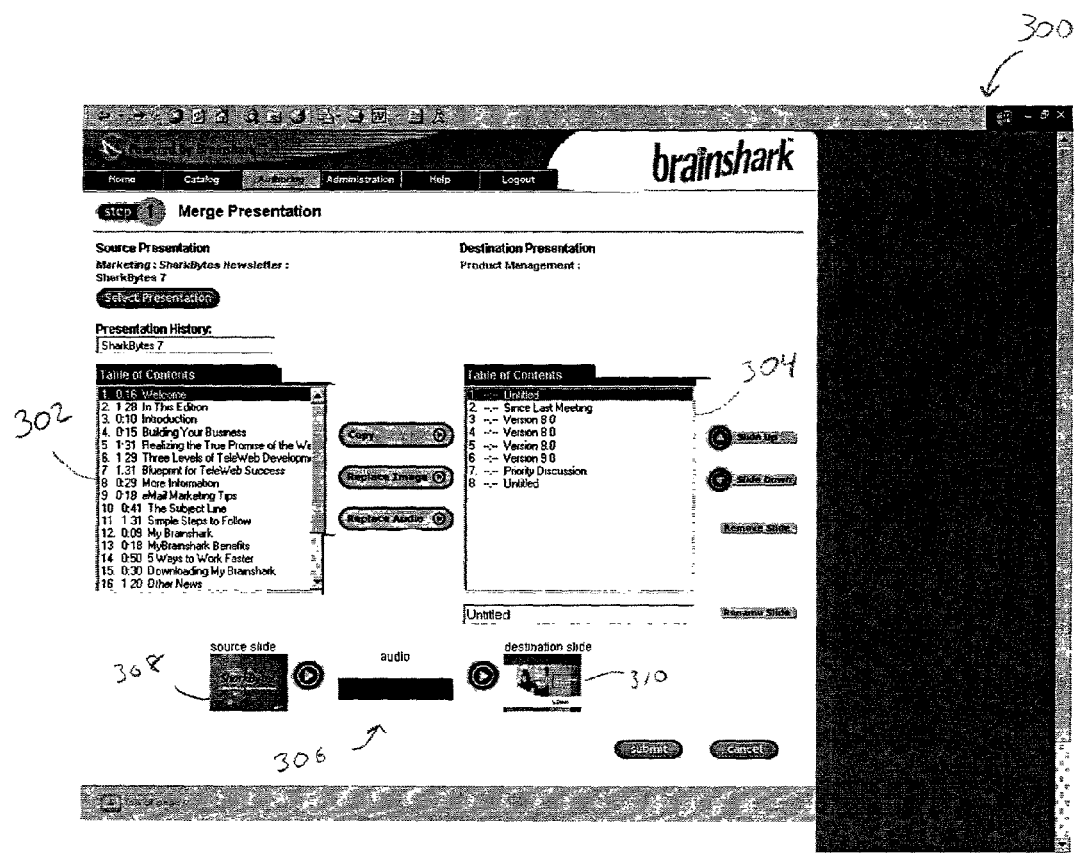
FIG. 15 is a screen printout of a merge presentation screen in accordance with the present invention.

FIG. 15 is a printout of a merge presentation page 300, which enables presentation components (e.g., audio, graphics, attachments) to be independently copied and/or merged from one presentation to another. Entire slides (with audio) may be copied from a source presentation to the destination presentation. Audio tracks, as well as the associated graphical image, may be copied separately from one source presentation slide to a destination presentation slide. For example, as shown in FIG. 15, the contents of a source presentation are shown in source window 302 and the contents of a destination presentation are shown in destination window 304. The composer, by selecting one of the slides of the source presentation, as shown in source window 302, may elect to copy the entire slide, including the associated audio portion, to the destination presentation, or may copy only the visual portion, or only the audio portion, to the destination presentation, by selecting a slide of the destination presentation to which the selected source presentation slide is to be copied. As shown at 306 of merge presentation page 300, the selected source slide 308, as well as the selected destination slide 310, are displayed to the composer during this process.

The host system 12 also includes a content re-use function which enables a composer to utilize slides which already saved on the host system from a previous presentation to compose another presentation. This composition of the presentation can take place using the merge presentation page 300 described above, or the composer could use the speech recognition function of the IVR 62 to instruct the host system of which slides of a presentation are to be included in a separate presentation. The audio narration clips can then be recorded using the telephone device 32 and the IVR 62. The latter embodiment does not necessitate the use of the computer 30 for composing the presentation.

As is described in detail below, a viewer is able to ask the composer questions about the presentation or the subject matter covered in the presentation. If the same questions are being asked by several viewers, the composer can create a "Frequently asked Questions" (FAQ) section and address these questions. The host system 12 also enables the composer to upload additional slides to add to existing presentation, perhaps in response to the FAQ's.

The composer can create a "Guest Book" by instructing the system 12 to display a form prior to, after or during the display of the viewing window that may capture certain data fields from the viewer (e.g., Name, E-mail Address, etc . . . ). These data values are stored as part of the viewing record and can be reported as part of the Viewing Usage Report described below in detail. Guest Books can be used to track anonymous viewers, to test user's comprehension of material. Furthermore, guest book answers may be used to change the content being displayed.

Viewing

Figure 8:
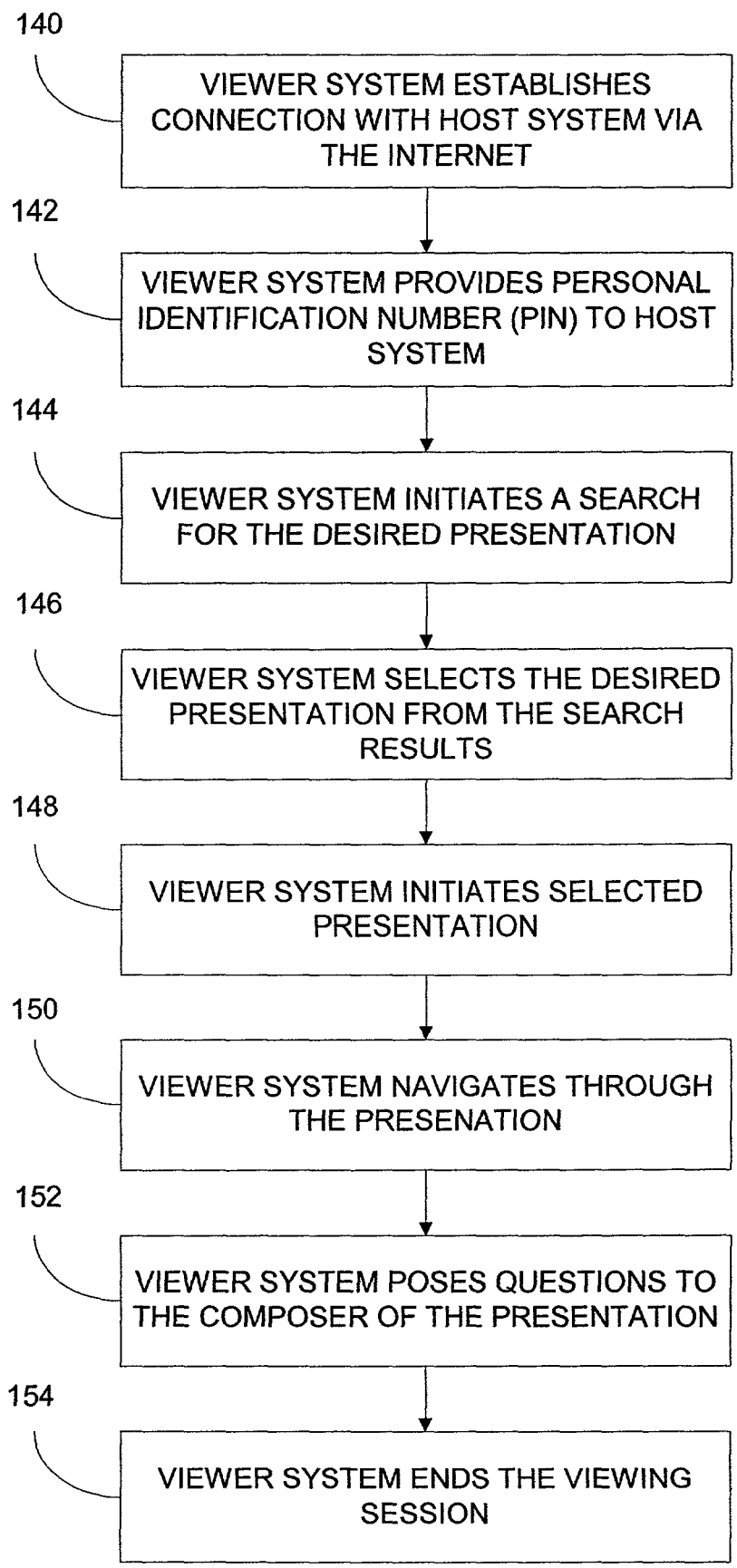
FIG. 8 is a flow diagram showing the steps involved in viewing a presentation stored on the host system in accordance with the present invention.

When a viewer desires to view a presentation, a connection between the viewer system 14 and the host system 12 is established via the internet, step 140, FIG. 8. Upon establishing the connection, the host system 12 performs an automatic configuration detection function which determines whether the viewer system includes all of the software necessary for viewing the presentations. If it does not, the host system adapts the to viewer system by providing a version of the presentation to the viewer system which the viewer system is capable of playing. For example, if the presentation is composed to be played on an up-to-date browser and the viewer system is using an out-dated browser, the host system 12 provides a version of the presentation to the viewer system which may be viewed without using the out-dated browser and instead using a media player available on the viewer system. Accordingly, the viewer system will be able to view the presentation without having to download additional software. Another example would be to automatically chose one media player when another is not available, or automatically select phone-only playback when no media player is available, in which only the audio portion of the presentation is provided to the viewer system.

Figure 9:
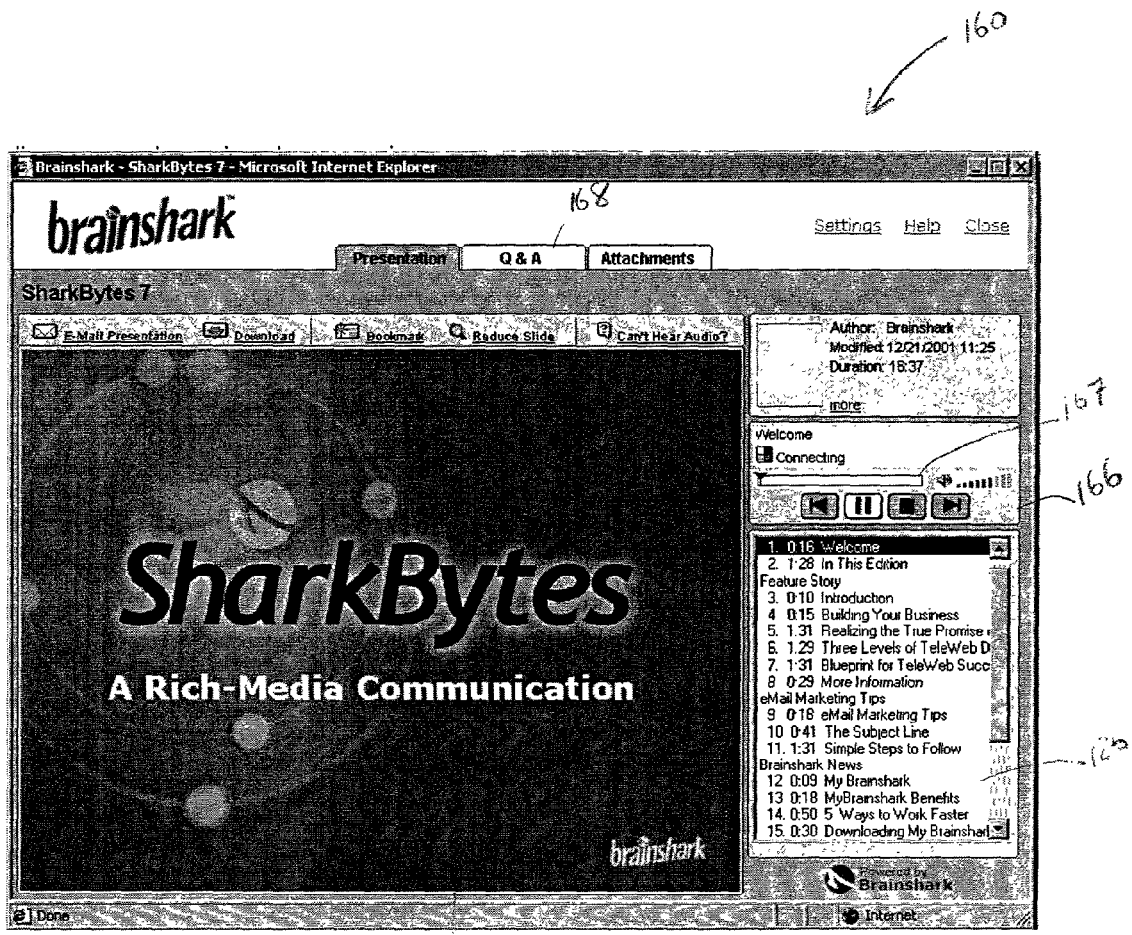
FIG. 9 is a schematic diagram of a presentation viewing screen in accordance with the present invention.
Figure 12:

The viewer system 14 then optionally provides the viewer's personal identification number (PIN) to the host system to enable the host system to grant access to the viewer of presentations which the viewer has been authorized to view, step 142. The security system employed by the host system 12 of the present invention is described in greater detail below. Once the viewer's PIN has been approved, the host system 12 transmits a presentation viewing screen 160, FIG. 9, to the viewer system 14. In step 144, the viewer system initiates a search for the desired presentation. This search is performed using the text entry boxes 162 located on a home or catalog page, or by browsing through a catalog of folders. Viewers can also navigate directly to presentations from other sources of links (e-mail, web sites, etc . . . ), or may navigate to presentations from a customizable home page. This home page enables viewers to see recently created presentations, highlighted presentations, and several folders of presentations. The home page includes templates which also allow users to use shortcuts (or wizards) to common procedures (e.g., Create Presentation, Send Presentation, Report on a Presentation). In the preferred embodiment, text entry boxes enable the viewer to search for a presentation by using keywords, the author's name or a presentation identification number.

The viewer then selects the desired presentation from the search results, step 146. When a presentation is selected, the host system 12 retrieves the first slide of the presentation and displays it in slide display window 164 and retrieves the audio narration clip associated with the first slide of the presentation. The host system 12 also lists the name of each slide and the duration of the associated audio narration clip in the contents window 126. The name of each slide is in the form of a link that enables the viewer to select slides out-of-order for viewing. In the presentation viewing screen 160, the length of the audio narration clip for each slide is shown in the contents window 126. The viewer system automatically initiates the presentation, step 148, by instructing the host system 12 to begin playing the audio narration clip for the first slide. The viewer is able to navigate through the presentation, step 150, using the presentation navigation buttons 166, which enable the viewer to pause the presentation, to repeat the presentation, and to skip between slides of the presentation. Other navigation features which are not shown or described herein may also be incorporated into the present invention in order to provide the viewer with additional navigation options. When the viewer simply instructs the host system 12 to play the presentation, the host system, plays the audio narration clip for the first slide. As set forth above, the audio narration clips are recorded in the Real Audio® and Microsoft® Media Player® format or telephone-playback format, such that only the appropriate plug-in needed to play these clips needs to be loaded onto the viewer system computer to enable the viewer to hear the audio narration clips. Prior to viewing, the viewer has the option to either pre-load all the slide images for efficient delivery on low bandwidth connections, or to load slides in order as the viewer navigates through the presentation. As the audio clip for the first slide is completed, the next slide in the presentation and its associated audio narration clip are retrieved from the database 100 by the host system 12 and transmitted to the viewer system 14 for playing. This process continues until either the presentation ends or the viewer pauses the presentation using the presentation navigation buttons 166. Viewers may navigate forward and backward within a single audio clip by using a slider control 167. Viewers may navigate forward and backward within a presentation by using either the active table-of-contents 126 or the forward, backward, pause, and stop player controls 166.

If, while the viewer is viewing the presentation, he or she has a question about the presentation, the viewer, by using Q&A tab 168, is able to access a page which enables the viewer to send a question to the composer or view the FAQ's that have been posted and answered by the composer. When the viewer clicks on an "E-mail a Question" button, a text box appears on the viewer system monitor which enables the viewer to type in a question. The question is then converted to an email message, including the viewer's email address, and sent to the composer system 16. Additionally, if the viewer clicks on the "FAQ's" button, a screen having a listing of the questions and answers provided by the composer are presented to the viewer.

Depending on the type and speed of the connection between the viewer system 14 and the host system 12, the viewer is able to select between a high bandwidth mode of viewing a presentation and a low bandwidth mode of viewing a presentation. The high bandwidth mode supports high quality audio and/or larger images. In order to reduce download times, in the low bandwidth mode, the viewer may select to download less data-intensive audio and visual files, which may be optimized for dialup connection speeds. The system automatically establishes alternative audio and visual files for high and low bandwidth transmission. High and low bandwidth audio is encoded to provide maximum quality at minimum size. The author can have control over optimizing the visual files for transmission by selecting image type and size.

The system enables the viewer to download and view each slide of a presentation simultaneously in real time. In this mode, the full audio and visual files are transmitted to the viewer for viewing. There is an alternate 'unhooked' or disconnected mode that enables the user to download and save a presentation for offline viewing at a later time. The unhooked mode also supports distribution of the presentation via email, CD, web, or any computer network.

The host system 12 has several security features built in that prevent unauthorized access to the presentations stored on the database 100 by both composers and viewers. As shown in FIG. 1, the system 10 includes a system administration system 18 and a company administration system 20. System administration system creates and deletes company accounts for companies which utilize the system 10 and grants or denies permission to the companies to utilize the system 10. Company administration system 20 creates and deletes accounts for persons to utilize the system 10 within the company account. In this context, a company can be made up of any group of people having a common interest. The company administration system 20 creates individual accounts for its people and assigns certain privileges to each account. For example, certain people within the company will only be allowed to view presentations and not to compose them. The identification information, such as a username and password, of such an account will enable the person to gain access to the host system 12 only for the purpose of viewing presentations. Further restrictions can include setting up categories (Folders) within a company, wherein certain people within a company can only access presentations associated with certain categories. Other people within the company can be allowed full access to all presentations and presentation composition privileges.

Additionally, the host system can control distribution of presentations by using an IP restriction protocol, wherein access to certain presentations is allowed only to users having an IP address within a specified range which is determined by the host system when the presentation is generated. Access to certain presentations can also be controlled using a referral restriction, wherein access to certain presentations is allowed only to viewers who have gained access to the host system site through a link from an approved referral site. The combinations of levels and types of allowable access are virtually limitless.

Reporting

Another feature of the host system 12 of the present invention is its ability to track various activities that take place by users of the system and generate reports that include use data in order to enable the system administration system 18 and the company administration system 20 to monitor the security of the system, to accurately bill for usage, to accurately plan for future expansion, to insure that personnel are viewing required presentations, to determine how much of the presentations each viewer is viewing, etc. The host system 12 is capable of generating the following reports, which may be generated on screen or exported to a Comma Separated Value (CSV) file:

Presentation Information Reports

For each presentation stored on the host system 12 a report can be generated which includes the following:
   The date and time that the presentation was created
   The presentation identification number
   The presentation title The presentation author The total duration of the presentation The total IVR session time for all composition and editing sessions The total file size of the presentation and all supporting materials Presentation Viewing Reports For each presentation stored on the host system 12 a report can be generated which includes the following:

The identification of parties who viewed the presentation

The dates and times the presentation was viewed

The total time that the presentation was viewed

The number of slides viewed

The host system 12 is capable of generating a viewing receipt which includes the information contained in the presentation viewing reports, which is emailed to the composer of a presentation after each viewing of the presentation. This enables the composer to keep track of the viewing details of each presentation via email or pager.

Presentation Summary Reports

For a specified date range and sorted by company and category within each company, the report includes the following:

The total number of presentations created

The total number of hours of content created

The total size of files uploaded

Composer Summary Reports

For a specified date range and sorted by company and category within each company, the report includes the following for each composer:

Presentation identification numbers

Presentation titles

The date the presentations were created

The duration of the presentations

The total IVR session time for all authoring and editing sessions

Viewer Summary Reports

For a specified date range and sorted by company and category within each company, the report includes the following:

The total number of viewers accessing presentations

Viewer Detail Reports

For a specified viewer, the report includes the following:

Presentation identification numbers

Presentation titles

The duration of the viewing sessions

The number of slides viewed

Additionally, the host system is capable of tracking anonymous viewers in email marketing campaigns by putting unique identifiers within the URL accessed by the anonymous viewer. Reports identifying individual anonymous users and/or showing from which marketing campaign anonymous users gained access to the host system can then be generated. Accordingly, the reports provide valuable information to the system and company administrator systems, which enable them to track the creation and dissemination of presentations, as well as the allocation of resources associated with the creation and dissemination of the presentations, and also enable presentation composers to determine the effectiveness of presentations by following which features or topics are more likely to be viewed.

Administration

The host system contains Administration features that allows designated administrators of the system to:

Customize the host catalog (folder names, descriptions, taxonomy).

Set numerous application preferences and control the enabling/disabling of many of the features throughout the application, including but not limited to: URL Referral restrictions (prevents users from accessing the content unless they enter through designated web pages), IP Restrictions (prevents users from accessing the content unless they fall within a designated IP range or specific IP address).Manage user profiles and user and folder-based content permissions.

Group users into logical groups.

Add users and user profiles, either manually through forms or automatically through self-registration through the host system.

Application Program Interface Calls (API)

Portions of the host system application may be accessed through XML-based API (Application Program Interface) calls. They include:

Company Related

Return a list of a company's users that match specific criteria

Return a count of a company's users that match specific criteria

User Related

Create a new host system user

Retrieve user information

Set login information for an existing user

Set other information for an existing user

Folder Related

Set Permissions for a host system folder

Presentation Related

Create a new presentation

Desktop Integration

Figure 16:
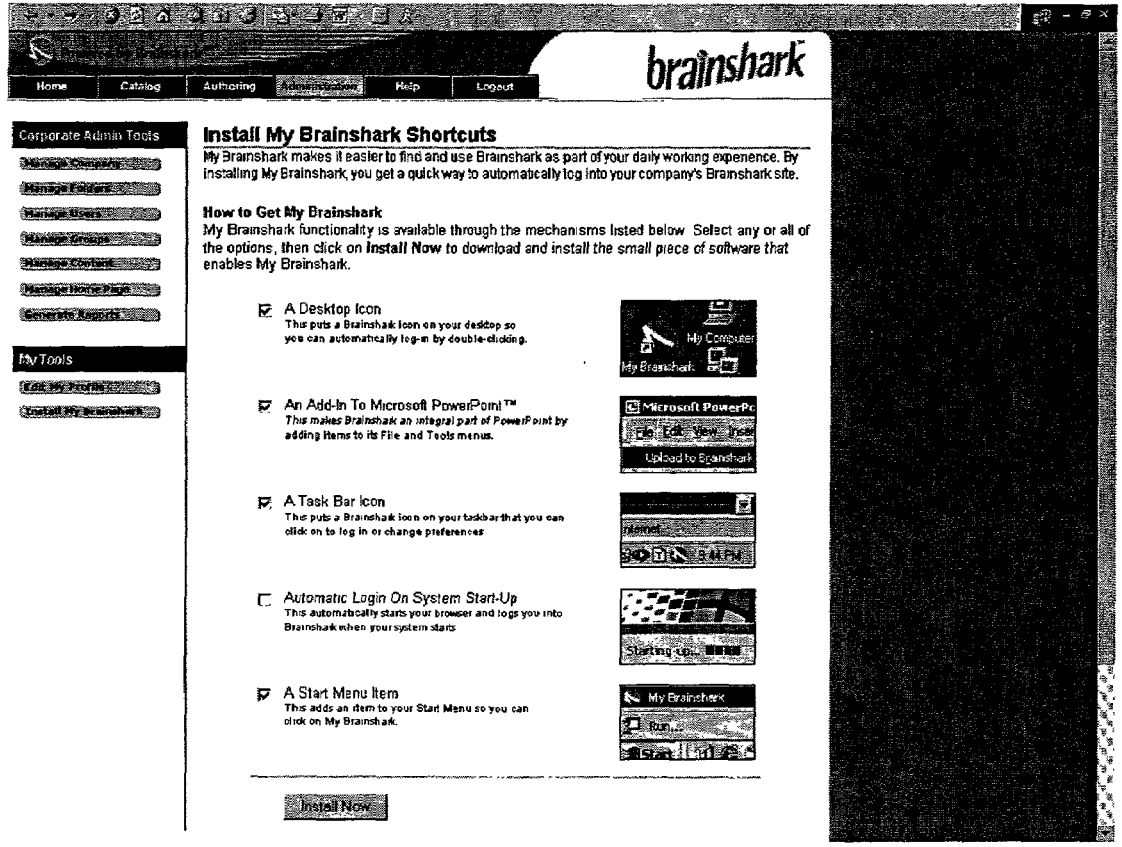
FIG. 16 is a screen printout illustrating the options to integrate the host system application onto a PC desktop.

Desktop Integration options enable users to upload and access content and host system features directly from their PC desktop—eliminating the need to open a web Browser and navigate to the host system site. This feature, illustrated in FIG. 16, adds shortcuts to the user's Windows® desktop, icon tray, Start Menu, PowerPoint® menus, and Microsoft Outlook® menus. The administrator is also able to customize the web page on which it accesses and views presentations. The content and "look" of the page may be altered by the viewer, to suite the needs of the viewer.

Figure 10:
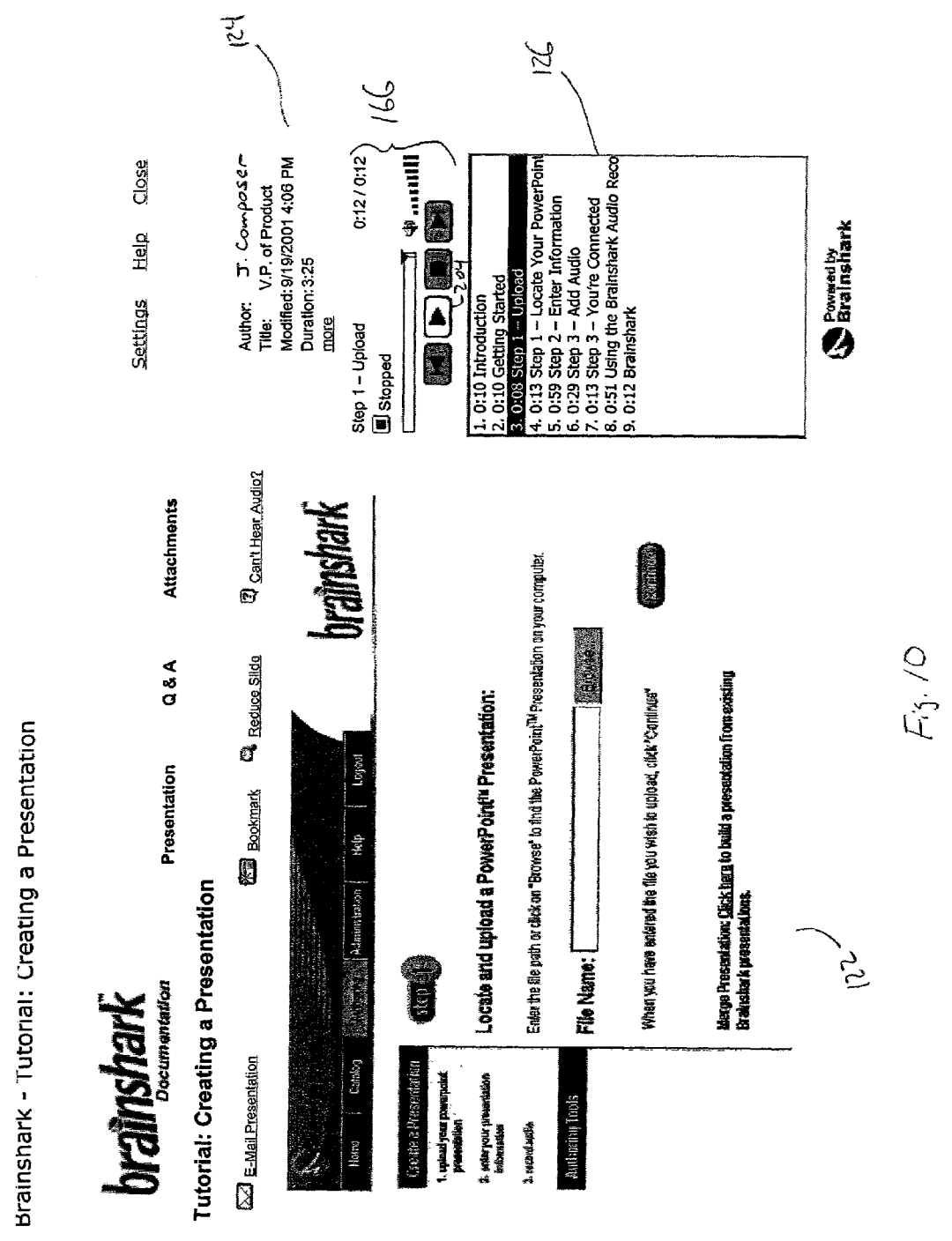
Figure 13:
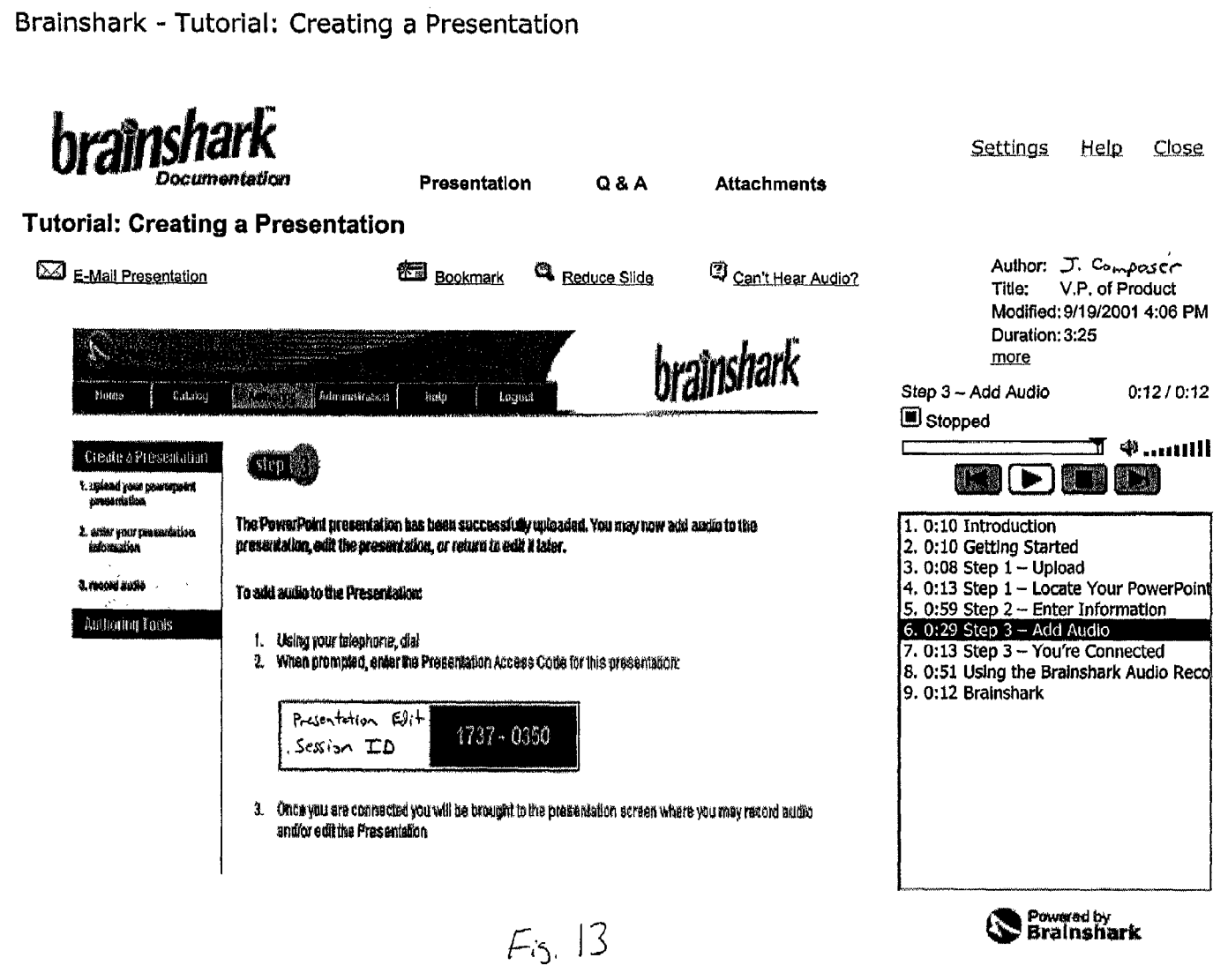
Figure 14:
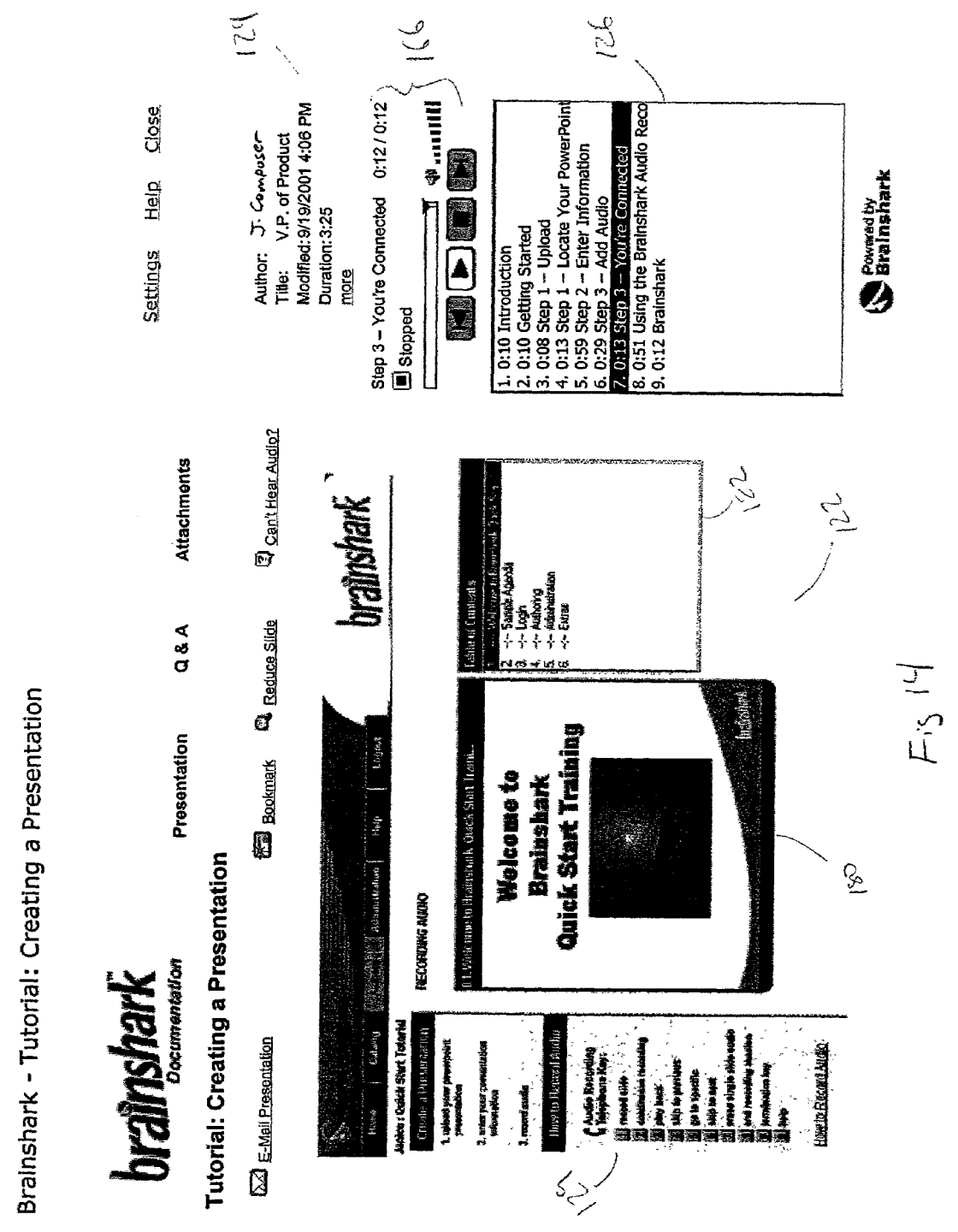

Referring now to FIGS. 10–14, an example that combines both the composition of a presentation and viewing of a presentation will be described. The presentation includes slides that show the viewer how to compose a presentation. Although in this example, the location of various components of the screen are different from those in the screen of FIG. 6, the functionality of the components is the same. FIG. 10 shows one of the screens that is transmitted to the composer system 16 after a connection between the composer system 16 and the host system 12 is established, step 40, FIG. 3. Screen 200 includes slide window 122, presentation information window 124 and contents window 126. The slides are navigated through using presentation navigation buttons 166. Slide window 122 shows the third slide of the presentation, as indicated by the highlighted entry in contents window 126. As shown in the contents window, slide 3 is entitled "Upload" and the associated audio narration clip is 8 seconds long. Slide 3, shown in slide window 122, is a slide graphic that is presented to a composer to prompt the composer to upload the slides to the host system 12. FIG. 11 shows slide 4, entitled "Locate Your Powerpoint® Presentation" and which includes an audio narration clip that is 13 seconds long. Slide 4 contains a graphic of a file upload window 202 that may be used by the composer to upload a particular set of slides to the host system 12. With the play button 204 clicked, the host system will, when the audio narration clip associated with slide 4 ends, retrieve slide 5 and its associated audio narration clip. After the composer has located the presentation, the presentation slides are uploaded to the host system 12, using the window shown in slide 3 of FIG. 10. In slide 4, FIG. 11, the composer selects the uploaded file from the files associated with the viewer's account. In slide 5, FIG. 12, information about the composer and the presentation is entered. This information is used for identification purposes and for the purpose of insuring that only viewers who are authorized to access this presentation can do so. This form can be used to set various presentation attributes, including searching and security attributes as well as "viewing receipts" which enable automatic e-mail receipts to be sent to the e-mail address specified whenever the presentation is viewed. After the presentation has been uploaded to the host system 12, slide 6 is shown, FIG. 13, which confirms that the presentation has been successfully uploaded and provides the composer with the Presentation Edit Session Identifier (PESI). At this point, the composer is instructed to contact the host system 12 via telephone 32 for the purpose of recording audio narration clips for each slide. As described above, when prompted by the IVR 62, the composer enters the PESI via the key pad of telephone 32. The IVR process shown in FIG. 4 is then carried out. FIG. 14 shows slide 7 of the presentation, which is a view of the screen presented to the composer during the composition process. The slide shows the current slide 180 for which an audio narration clip is to be recorded, the contents window 182 showing the order and title of the slides of the presentation. FIG. 14 also shows the IVR navigation window 129.

Accordingly, the present invention provides a method of and system for composing, presenting and viewing presentations over a communications network which enables authors to upload the visual portion of a presentation, such Power Point slides, to a server system and to record the audio portion of the presentation by using a telephone. The visual portion and the audio portion are synchronized and stored on the host system. A person who desires to view the presentation logs onto the site that is hosting the presentation, and selects the presentation for viewing. The viewer is able to view the entire presentation or certain slides of the presentation by using navigation tools provided by the system. The system is capable of providing various reports that include tracking information about the presentations and information regarding the use of the system by composers and viewers.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A system for composing audio-visual presentations over a communications network comprising:
   a composer system including a computer processor and associated memory and a telephone device, said composer system having a presentation containing a plurality of visual slides stored in said memory; and
   a host system including a computer processor and associated memory;
   wherein said composer system:
   A. establishes a connection between said computer processor of said composer system and said host system over a communications network and uploads said presentation to said host system over said communications network; and
   B. establishes a connection between said telephone device and said host system and records an audio narration clip for each visual slide; and wherein said host system synchronizes each audio narration clip with its associated visual slide and stores the resulting audio-visual presentation in said memory of said host system thereby facilitating automatic display of the visual slides and synchronized play of the audio narration clip corresponding thereto.

2. The system of claim 1 wherein said host system includes an interactive voice response system which is connectable to said telephone device of said composer system and which processes said audio narration clips.

3. The system of claim 2 wherein said interactive voice response system is responsive to inputs provided by the composer system through a keypad of the telephone device.

4. The system of claim 2 wherein said interactive voice response system includes a speech recognition component which is responsive to verbal inputs provided by the composer system through a transmitter of the telephone device.

5. The system of claim 1 wherein said visual slides are in the form of one of a Powerpoint® slide, a Visio® graphic, a Word® document, an Excel® document, and an Adobe® PDF file.

6. The system of claim 1 wherein said communications network is the internet.

7. The system of claim 1 wherein said communications network is an intranet.

8. The system of claim 1 wherein said host system includes at least one graphical user interface which is transmitted to said composer system for enabling said composer system to compose said audio-visual presentation.

9. The system of claim 8 wherein one of said at least one graphical user interfaces includes a slide upload page including a text box for enabling the composer system to enter the name of the presentation which is to be uploaded to said host system.

10. The system of claim 8 wherein one of said at least one graphical user interfaces includes an audio recording page for enabling the composer system to record said audio narration clips, including a current slide window for displaying the slide for which an audio narration clip is being recorded and a recording navigation window, including a list of functions associated with the keys on a keypad of said telephone device.

11. The system of claim 10 wherein said audio recording page further includes a contents window for displaying a title of each visual slide of a selected presentation.

12. The system of claim 8 wherein one of said at least one graphical user interfaces includes an edit page for enabling the composer system to perform edit functions within a presentation, said edit page including a contents window for displaying a title of each visual slide of a selected presentation and a slide preview window for displaying a slide which has been selected in said contents window for editing.

13. The system of claim 12 wherein said edit fiction includes rearranging slides, renaming slides, deleting slides and uploading new slides.

14. The system of claim 8 wherein one of said at least one graphical user interfaces includes a merge page for enabling said composer system to edit a presentation by copying at least one of said plurality of visual slides and at least one of said audio narration clips from a source presentation to a destination presentation, said merge page including a source presentation contents window for displaying a title of each visual slide of said source presentation and a destination presentation contents window for displaying a title of each visual slide of said destination presentation.

15. The system of claim 14 wherein said merge page further includes a source slide preview window for displaying a selected slide of said source presentation.

16. The system of claim 15 wherein said merge page further includes a destination slide preview window for displaying a selected slide of said destination presentation.

17. The system of claim 1 further comprising at least one viewer system, each including a computer processor and associated memory, wherein said viewer system is connectable to said host system over said communications network for receiving a presentation stored on said host system for viewing.

18. The system of claim 17 wherein, upon connecting to said host system over said communications network, said viewer system is able to view a presentation stored on said host system as the presentation is received by said viewer system.

19. The system of claim 17 wherein, upon connecting to said host system over said communications network, said viewer system is able to download a presentation from said host system for viewing after said connection has been terminated.

20. The system of claim 17 wherein said host system includes a tracking component which records information about said presentations, including at least one of the identity of the composer system that composed a particular presentation, the identity of each viewer system that downloads the particular presentation, the time at which the particular presentation was viewed, and how many slides of said particular presentation were viewed.

21. The system of claim 20 wherein said host system includes a report component which generates reports from said presentation information obtained by said tracking component.

22. The system of claim 20 wherein said host system generates a viewing receipt which includes said presentation information recorded by said tracking component, wherein said viewing receipt is transmitted to said composer system when a presentation composed by said composer system is viewed by said viewer system.

23. The system of claim 17 wherein said audio narration clips are played through said computer processor of said viewer system.

24. The system of claim 17 wherein said viewer system further comprises a telephone device which is connectable to said host system and said audio narration clips are played through said telephone synchronous with its associated visual slide.

25. The system of claim 17 wherein said host system includes a security component for controlling access to said presentations by said at least one viewer system.

26. The system of claim 25 wherein said security component requires that said viewer system provide an assigned identification index before accessing said presentations.

27. The system of claim 26 wherein said identification index provides said viewer system with access to less than all of the presentations stored on said host system.

28. A method of composing an audio-visual presentation comprising:
  A. establishing a connection between a computer of a composer system and a host system over a communications network;
  B. uploading a presentation containing a plurality of visual slides from a said composer system to said host system;
  C. establishing a connection between a telephone device of said composer system and said host system;
  D. recording an audio narration clip for each of said visual slides using said telephone device;
  E. synchronizing each audio narration clip with its associated visual slide thereby facilitating automatic display of the visual slides and synchronized play of the audio narration clip corresponding thereto; and
  F. storing the resulting audio-visual presentation in a memory of said host system.

29. The method of claim 28 wherein step D comprises processing said audio narration clips with an interactive voice response system which is connectable to said telephone device of said composer system.

30. The method of claim 29 wherein said interactive voice response system is responsive to inputs provided by the composer system through a keypad of the telephone device.

31. The method of claim 29 wherein said interactive voice response system includes a speech recognition component which is responsive to verbal inputs provided by the composer system through a transmitter of the telephone device.

32. The method of claim 28 wherein said visual slides are in the form of one of a Powerpoint® slide, a Visio® graphic, a Word® document, an Excel® document, and an Adobe® PDF file.

33. The method of claim 28 wherein said communications network is the internet.

34. The method of claim 28 wherein said communications network is an intranet.

35. The method of claim 28 further comprising transmitting at least one graphical user interface from said host system to said composer system for enabling said composer system to compose said audio-visual presentation.

36. The method of claim 35 wherein one of said at least one graphical user interfaces includes a slide upload page including a text box for enabling the composer system to enter the name of the presentation which is to be uploaded to said host system.

37. The method of claim 35 wherein one of said at least one graphical user interfaces includes an audio recording page for enabling the composer system to record said audio narration clips, including a current slide window for displaying the slide for which an audio narration clip is being recorded and a recording navigation window, including a list of functions associated with the keys on a keypad of said telephone device.

38. The method of claim 37 wherein said audio recording page further includes a contents window for displaying a title of each visual slide of a selected presentation.

39. The method of claim 35 wherein one of said at least one graphical user interfaces includes an edit page for enabling the composer system to perform edit functions within a presentation, said edit page including a contents window for displaying a title of each visual slide of a selected presentation and a slide preview window for displaying a slide which has been selected in said contents window for editing.

40. The method of claim 39 wherein said edit functions include rearranging slides, renaming slides, deleting slides and uploading new slides.

41. The method of claim 35 wherein one of said at least one graphical user interfaces includes a merge page for enabling said composer system to edit a presentation by copying at least one of said plurality of visual slides and at least one of said audio narration clips from a source presentation to a destination presentation, said merge page including a source presentation contents window for displaying a title of each visual slide of said source presentation and a destination presentation contents window for displaying a title of each visual slide of said destination presentation.

42. The method of claim 41 wherein said merge page further includes a source slide preview window for displaying a selected slide of said source presentation.

43. The method of claim 42 wherein said merge page further includes a destination slide preview window for displaying a selected slide of said destination presentation.

44. The method of claim 28 further comprising:
G. establishing a connection between a viewer system and said host system; and
H. receiving a presentation stored on said host system for viewing; and
I. viewing said presentation.

45. The method of claim 44 wherein step I includes viewing said presentation as the presentation is received by said viewer system.

46. The method of claim 44 wherein step I includes viewing said presentation after said connection has been terminated.

47. The method of claim 44 further including said host system recording information about said presentations, including at least one of the identity of the composer system that composed a particular presentation, the identity of each viewer system that downloads the particular presentation, the time at which the particular presentation was viewed, and how many slides of said particular presentation were viewed.

48. The method of claim 47 further comprising said host system generating reports from said recorded presentation information.

49. The system of claim 47 further comprising said host system generating a viewing receipt which includes said recorded presentation; and transmitting said viewing receipt to said composer system when a presentation composed by said composer system is viewed by said viewer system.

50. The method of claim 44 wherein step I includes playing said audio narration clips through a computer processor of said viewer system.

51. The method of claim 44 wherein step I includes playing said audio narration clips through a telephone device which is connectable to said host system.

52. The method of claim 44 further comprising said host system controlling access to said presentations by said at least one viewer system.

53. The method of claim 52 wherein said security component requires that said viewer system provide an assigned identification index before accessing said presentations.

54. The method of claim 53 wherein said identification index provides said viewer system with access to less than all of the presentations stored on said host system.

* * * * *